(12) United States Patent
Huang et al.

(10) Patent No.: US 12,198,541 B2
(45) Date of Patent: Jan. 14, 2025

(54) TRAFFIC FLOW FORECASTING METHOD BASED ON MULTI-MODE DYNAMIC RESIDUAL GRAPH CONVOLUTION NETWORK

(71) Applicant: EAST CHINA JIAOTONG UNIVERSITY, Nanchang (CN)

(72) Inventors: Xiaohui Huang, Nanchang (CN); Yuming Ye, Xingning (CN); Jiahao Ling, Changsha (CN); Yuan Jiang, Nanchang (CN); Liyan Xiong, Nanchang (CN)

(73) Assignee: EAST CHINA JIAOTONG UNIVERSITY, Nanchang (CN)

( * ) Notice: Subject to any disclaimer, the term of this patent is extended or adjusted under 35 U.S.C. 154(b) by 363 days.

(21) Appl. No.: 17/831,081

(22) Filed: Jun. 2, 2022

(65) Prior Publication Data
US 2023/0334981 A1 Oct. 19, 2023

(30) Foreign Application Priority Data
Apr. 19, 2022 (CN) .................. 202210411429.4

(51) Int. Cl.
*G08G 1/01* (2006.01)
*G06F 17/17* (2006.01)

(52) U.S. Cl.
CPC .......... *G08G 1/0129* (2013.01); *G06F 17/17* (2013.01)

(58) Field of Classification Search
CPC .. G08G 1/0129; G08G 1/0104; G08G 1/0133; G06F 17/17; G06N 20/00; G06N 3/045; G06N 3/08
See application file for complete search history.

(56) References Cited

U.S. PATENT DOCUMENTS

| | | | |
|---|---|---|---|
| 2015/0127243 A1* | 5/2015 | Jang .................... | G08G 1/0116 701/117 |
| 2019/0164418 A1* | 5/2019 | Neukart ............... | G08G 1/0129 |
| 2022/0343146 A1* | 10/2022 | Xue .................... | G06N 3/0442 |
| 2023/0306489 A1* | 9/2023 | Kong .................. | G06N 5/04 |
| 2023/0394284 A1* | 12/2023 | Zwicklbauer .......... | G06N 3/042 |

* cited by examiner

*Primary Examiner* — Dalena Tran

(57) ABSTRACT

Disclosed is a traffic flow forecasting method based on a multi-mode dynamic residual graph convolution network, including following steps: constructing a relationship matrix and an adaptive matrix to learn the site dependence relationship for historical traffic data of traffic stations; using multi-mode dynamic graph convolution to extract traffic characteristics corresponding to different traffic modes; embedding the graph convolution into the gated cyclic neural network to realize the combination of space dependence and time dependence of traffic flow; connecting the network by using the dynamic residual, and combining the input traffic data with the decoding data to obtain the final forecasting value. The application utilizes two different methods to construct adjacency matrix, effectively captures traffic flow characteristics corresponding to different traffic modes, and dynamically fuses traffic flow characteristics of two different modes.

8 Claims, 6 Drawing Sheets

TRAFFIC FLOW FORECASTING METHOD BASED ON MULTI-MODE DYNAMIC RESIDUAL GRAPH CONVOLUTION NETWORK

CROSS-REFERENCE TO RELATED APPLICATIONS

This application claims priority to Chinese Patent Application No. 202210411429.4, filed on Apr. 19, 2022, the contents of which are hereby incorporated by reference.

TECHNICAL FIELD

The application relates to the field of traffic flow forecasting, and in particular to a traffic flow forecasting method based on a multi-mode dynamic residual graph convolution network.

BACKGROUND

Urban traffic congestion is not only an important cause of traffic accidents, but also one of the important factors hindering urban development. With the continuous development of Internet technology, network, monitoring and various electronic sensor devices are widely used in urban road traffic management and control, resulting in massive traffic data, such as vehicle trajectory data, traffic flow data, vehicle speed data, etc., which can be used to learn the changing law of traffic trajectory, traffic congestion and the judgment of traffic accidents. Therefore, learning the time variation law of traffic flow from the historical traffic flow data can forecast the traffic congestion in urban areas or roads in the future, so that the urban traffic planning department can take corresponding preventive measures and evacuate the traffic congestion in time to avoid traffic accidents, which is very important for urban traffic safety and maintaining social stability.

However, urban traffic flow is often affected by road environment. Because of complex topology of the traffic networks, there may be many different traffic modes in the traffic network that affect the traffic flow of the network at the same time, and they may be affected by different factors at the same time, such as complex traffic network structure, weather conditions and emergencies. How to learn the characteristics of different traffic patterns from traffic flow and integrate them is a difficult point in traffic flow forecasting.

SUMMARY

The objective of the present application is to provide a traffic flow forecasting method based on a multi-mode dynamic residual graph convolution network, so as to solve problems existing in the prior art.

To achieve the above objective, the present application provides a traffic flow forecasting method based on multi-mode dynamic residual graph convolution network, including:
constructing an adjacency matrix, and acquiring different traffic flow modes based on an adjacency matrix;
fusing the different traffic flow modes dynamically;
forecasting future traffic based on historical data and fused data.

Optionally, the adjacency matrix includes a relational matrix and an adaptive matrix, and the relational matrix is:

$$[X_{t_a:t_a+\tau-1}] \xrightarrow{similarity} \overline{A}_{rel},$$

$$A_{rel} = \text{softmax}(\overline{A}_{rel}),$$

where subscript $t_a$ represents the first time step of generating the relational matrix, $\tau$ represents that the relational matrix is constructed with the traffic data of $\tau$ historical time steps, and Soft max represents an activation function.

the adaptive matrix is:

$$A_{ada} = \text{soft max}(\text{Relu}(E_1 E_2^T)),$$

where both $E_1$ and $E_2$ represent learning nodes, ReLU represents an activation function, and T represents a matrix transposition.

Optionally, in the process of acquiring different traffic flow modes based on the adjacency matrix, the different traffic flow modes include time traffic dependence and space traffic dependence;
acquiring the time traffic dependence based on the relational matrix, and acquiring the space traffic dependence based on the adaptive matrix.

Optionally, the process of dynamically fusing the different traffic flow modes includes: fusing the time traffic dependence and the space traffic dependence in time and space.

Optionally, in the process of fusing the time traffic dependence and the space traffic dependence in time and space, the following formula is adopted for fusion:

$$h = W_{rel} \times h_{rel} + W_{ada} \times h_{ada}$$

where h is represents final output, $h_{rel}$ represents characteristics of time traffic dependence, $h_{ada}$ represents characteristics of space dependence, and $W_{rel}$ and $W_{ada}$ represent two learning parameters, which are updated with a training of neural network, so as to dynamically fusing the characteristics of time dependence and space dependence.

Optionally, the process of forecasting the future traffic based on the historical data and the fused data includes:
constructing a decoder, inputting the historical data into the decoder to obtain output data;
fusing the historical data and the output results based on a dynamic residual fusion mechanism to obtain a forecasting result of future traffic.

Optionally, the process of fusing the historical data and the output results based on the dynamic residual fusion mechanism includes:
fusing by using the following formula:

$$\hat{Y} = H \times W_1 + X \times W_2$$

where H represents the final output of the decoder, X represents the historical data of a original input, and $W_1$ and $W_2$ represent training parameters.

Optionally, the process of fusing the historical data and the output results based on the dynamic residual fusion mechanism to obtain the forecasting result of future traffic further includes: the loss function is a root mean square error, and the formula of the loss function is as below:

$$RMSE = \sqrt{\frac{1}{Q}\sum_i (Y_i - \hat{Y}_i)^2},$$

where $\hat{Y}_i$ and $Y_i$ represent a true value and a forecasting value respectively, and Q represents forecasted time steps.

The application has the following technical effects:

(1) In the traditional traffic flow forecasting, only a kind of adjacency matrix is usually used to capture the traffic characteristics in the traffic network, but a single adjacency matrix cannot capture the traffic characteristics corresponding to different traffic modes. The application utilizes two different methods to construct an adjacency matrix, which can effectively capture the traffic flow characteristics corresponding to different traffic modes and dynamically fuse the traffic flow characteristics of two different modes.

(2) By replacing the linear transformation operation in the gated cyclic neural network with the multi-mode dynamic graph convolution, the application combines the multi-mode dynamic graph convolution and gated cyclic unit to form a new module, thus realizing the simultaneous capture of the space dependence and time dependence of traffic flow.

(3) In a conventional traffic flow forecasting algorithm, the influence of historical input data on the final forecasting result is often ignored. In this application, the dynamic residual network is used to screen out useful information from the historical flow data to update the future flow, so as to improve the forecasting accuracy.

BRIEF DESCRIPTION OF THE DRAWINGS

The figures that form a part of this application are used to provide a further understanding of this application. The illustrative embodiments of this application and their descriptions are used to explain this application, and do not constitute undue limitations on this application. In the attached figures.

DETAILED DESCRIPTION OF THE EMBODIMENTS

It should be noted that the embodiments in this application and the characteristics in the embodiments may be combined with each other without conflict. The application will be described in detail with reference to the figures and embodiments.

It should be noted that the steps shown in the flowcharts of the figures may be executed in a computer system such as a set of computer-executable instructions; although a logical sequence is shown in the flowcharts, in some cases, the steps shown or described may be executed in a sequence different from that here.

Embodiment 1

Figure 1:
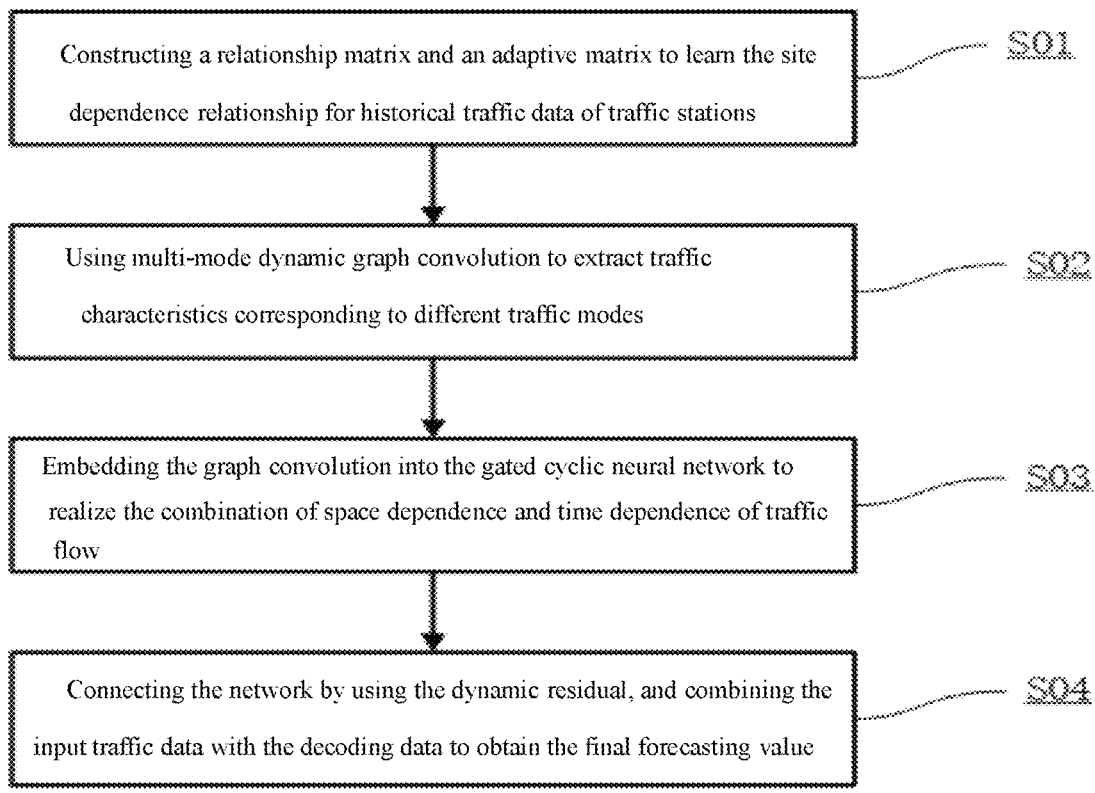
FIG. 1 is a flowchart of an embodiment of the present application.
Figure 2:
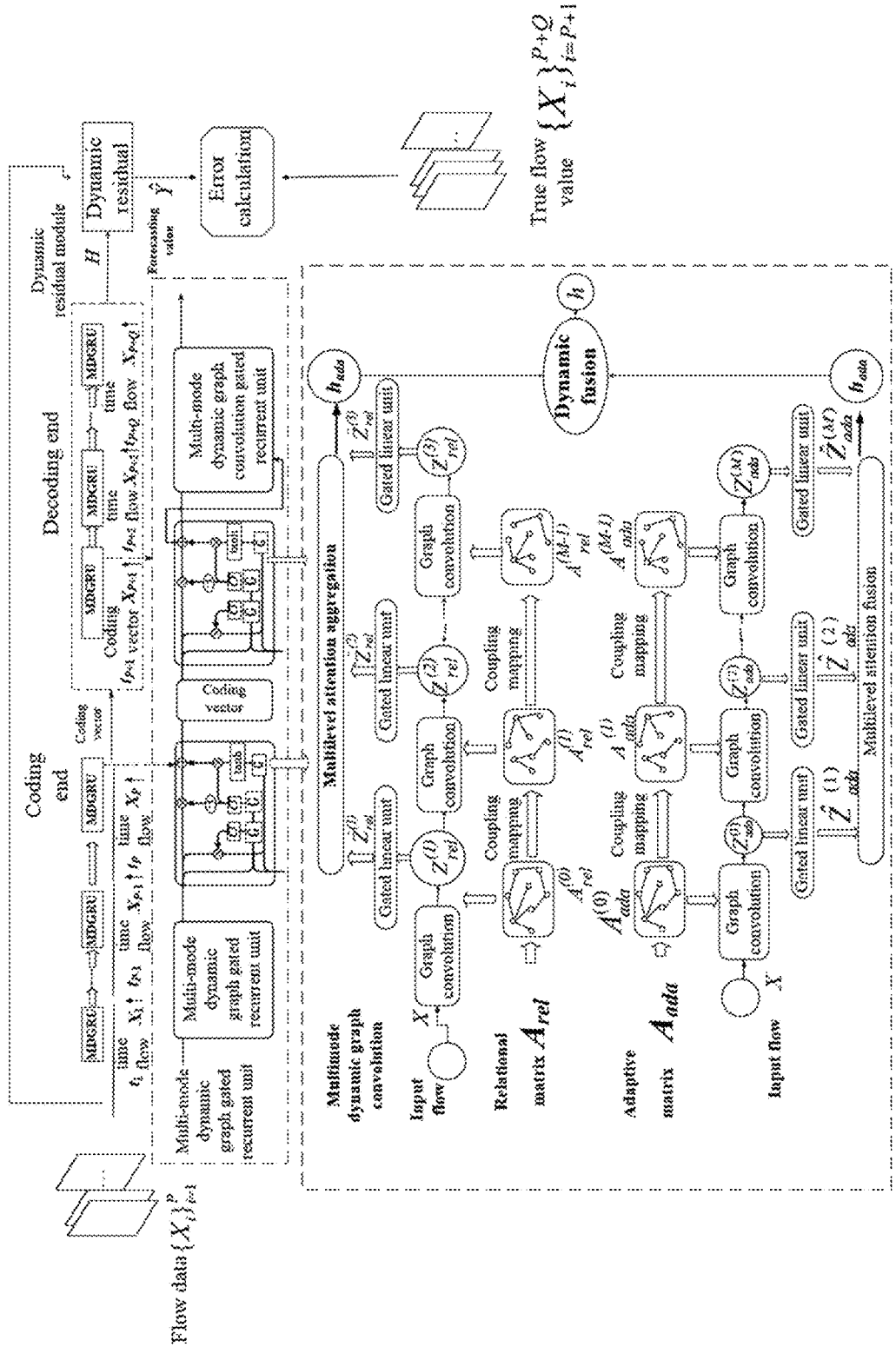
FIG. 2 is a model diagram of a traffic flow forecasting method according to an embodiment of the present application.

As shown in FIGS. 1 and 2, this embodiment provides a traffic flow forecasting method based on multi-mode dynamic residual graph convolution network, which includes:

S01: extracting multi-traffic-mode traffic feature, capturing the traffic characteristics corresponding to different traffic modes from the traffic flow data of road network by using various adjacency matrix construction methods.

Figure 3:
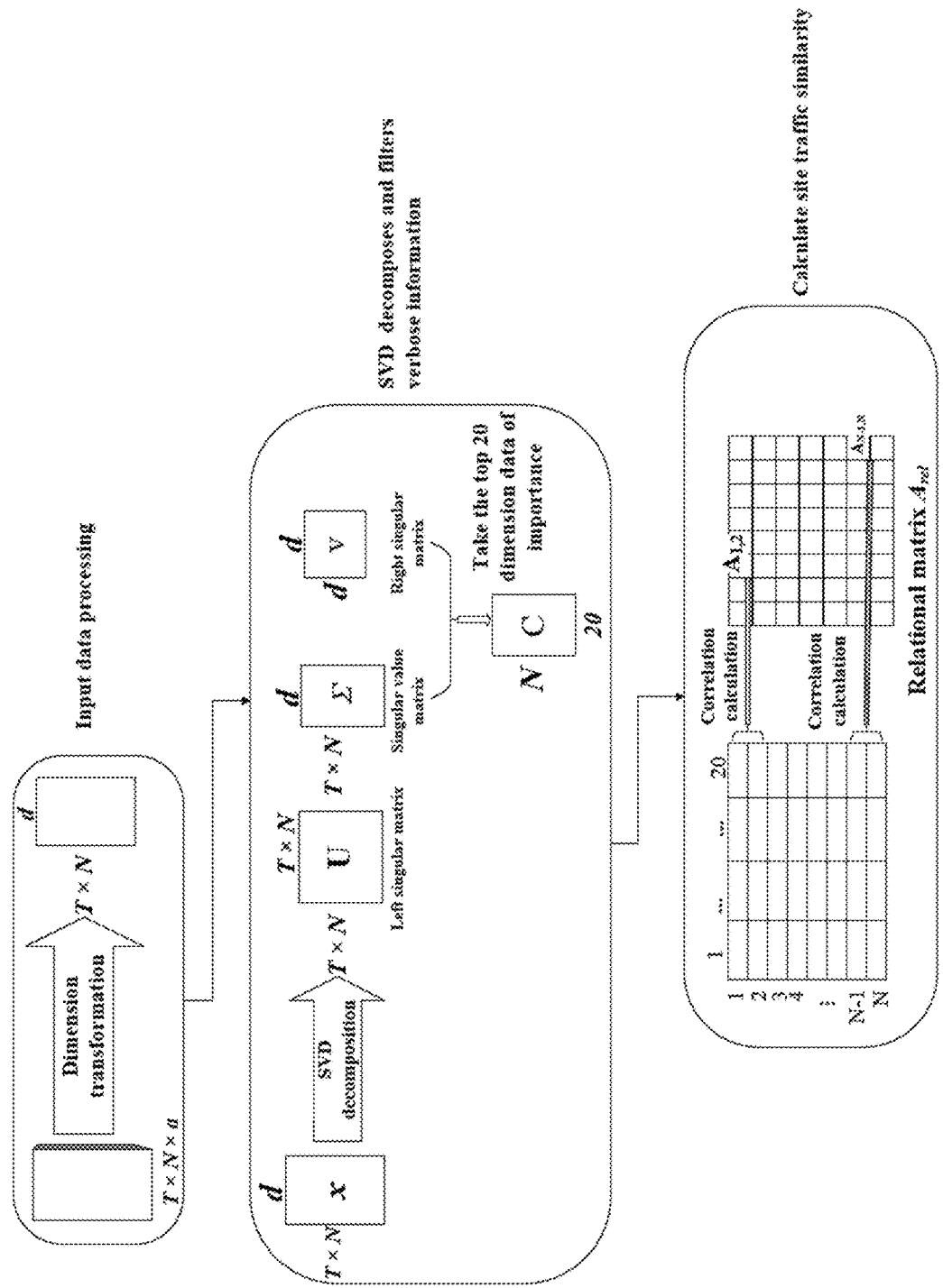
FIG. 3 is an example of the construction of a traffic relational matrix according to an embodiment of the present application.

The concrete implementation process is as follows: constructing a similarity matrix to capture the space dependence characteristics of regular traffic, and constructing an adaptive matrix to capture the space dependence characteristics of random traffic. The construction process of the similarity matrix is as follows:

$$[X_{t_a:t_a+\tau-1}] \xrightarrow{similarity} \overline{A}_{sim},$$

$$A_{sim} = \text{softmax}(\overline{A}_{sim}),$$

where similarity represents the similarity between the calculated site flows, and its specific calculation process is shown in FIG. 3. Subscript $t_a$ represents the first time step to generate the relational matrix, $\tau$ represents the traffic data of $\tau$ historical time steps to construct the relational matrix, and soft max represents the activation function.

The construction process of the adaptive matrix is as follows:

$$A_{ada} = \text{soft max}(\text{Relu}(E_1 E_2^T)),$$

where $E_1$ and $E_2$ are all learnable nodes, ReLU is an activation function, and T represents matrix transposition.

S02: sending the two adjacency matrices obtained by learning into the graph convolution network to extract the traffic characteristics of different traffic modes; for the extracted traffic characteristics of two different modes, using the dynamic fusion module to integrate the two traffic characteristics.

Figure 4:
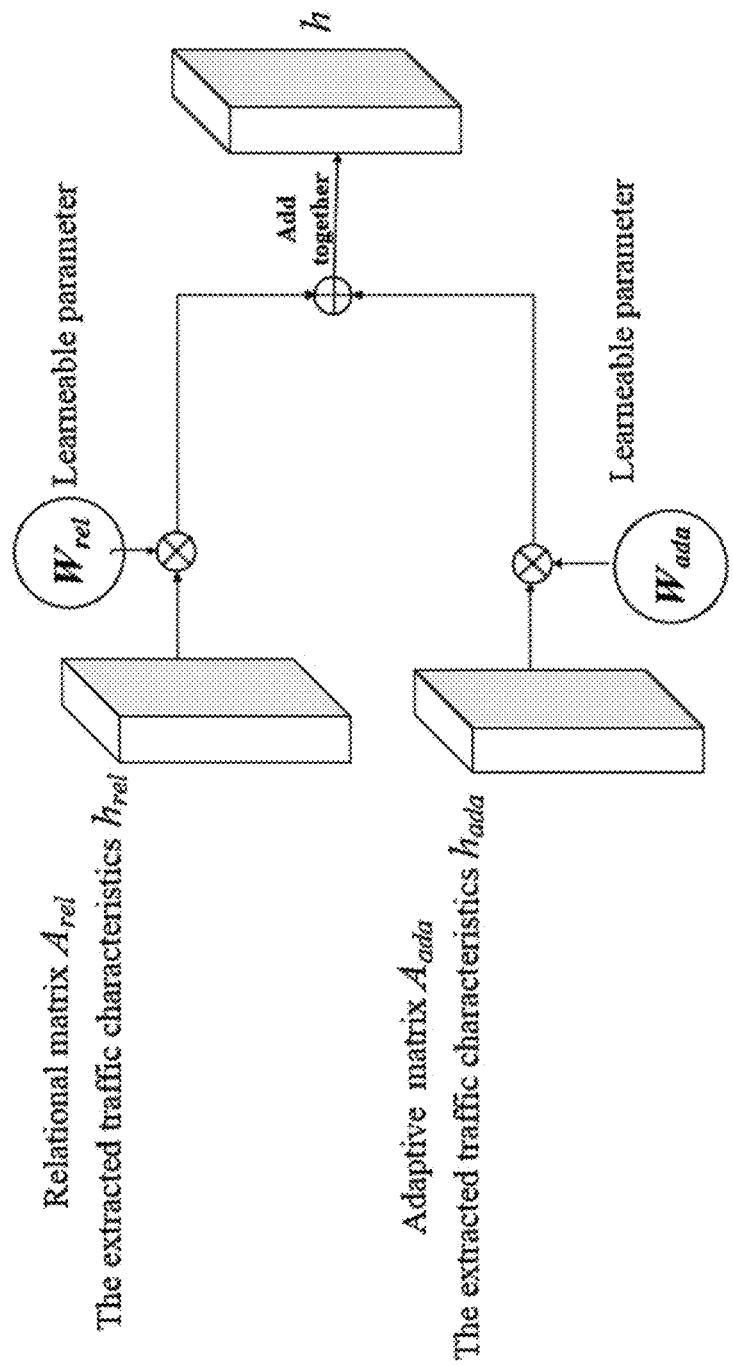
FIG. 4 is an example of dynamic integration of two traffic mode characteristics in the embodiment of the present application.

The specific implementation process is as follows: the output $h_{sim}$ and $h_{ada}$ of two adjacency matrices after graph convolution defines two trainable parameter $W_{rel}$ and $W_{ada}$, which are multiplied by $h_{sim}$ and $h_{ada}$ and then added. With the training of the model, $W_{sim}$ and $W_{ada}$ are constantly updated, so as to dynamically fuse the traffic characteristics corresponding to different traffic modes, and combine the outputs of the two modules to obtain the final output h of dynamic graph convolution. The dynamic integration process of different traffic modes is shown in FIG. 4.

Figure 5:
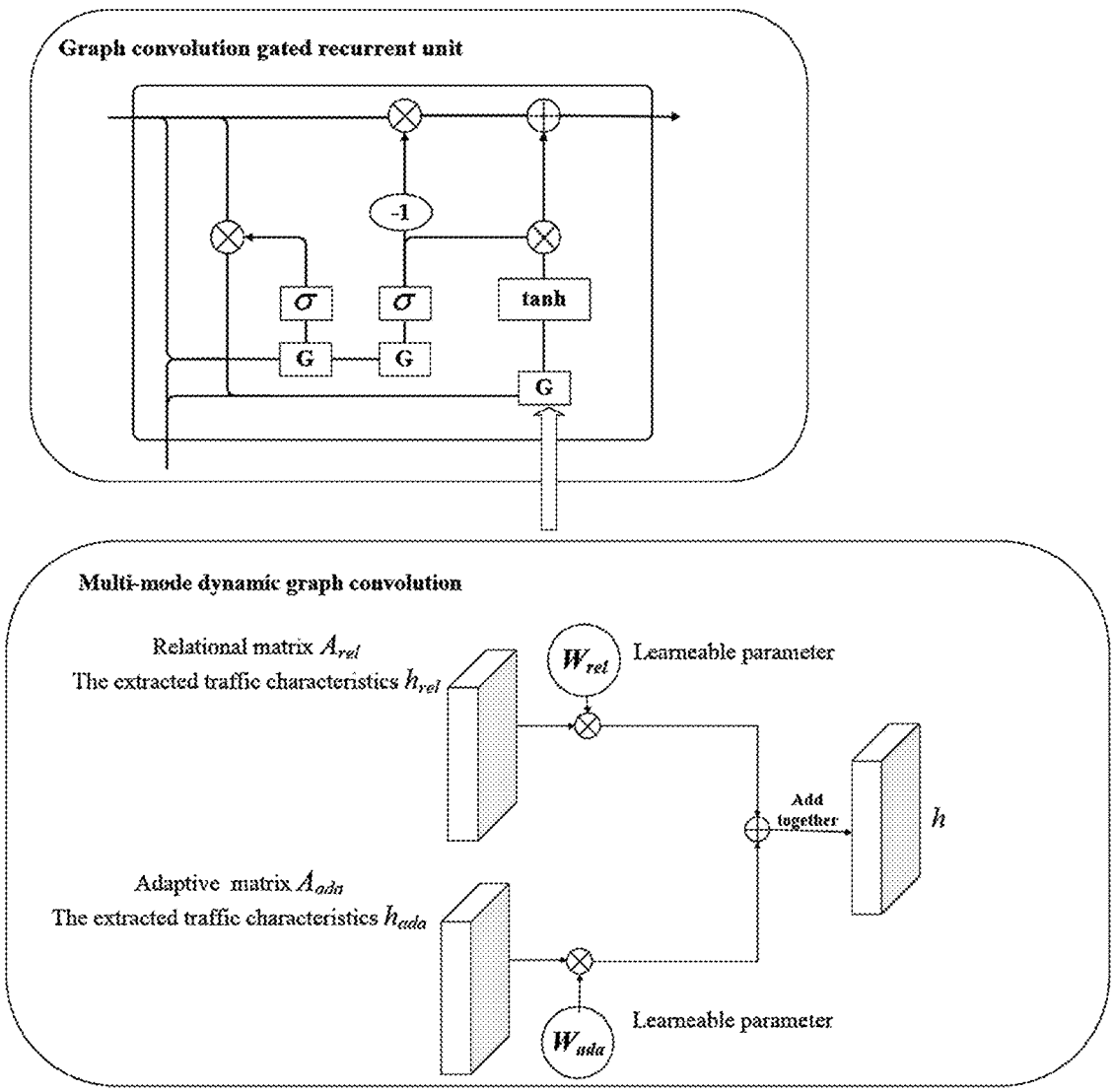
FIG. 5 is an example of combining multi-mode dynamic graph convolution with a gated cyclic neural network according to the embodiment of the present application.

S03: fusing the space dependence characteristics and time dependence characteristics of traffic flow. The multi-mode dynamic graph convolution unit extracts the traffic characteristics corresponding to different traffic modes, and sends the characteristics into the recurrent neural network to realize the combination of space dependence and time dependence of traffic flow, as shown in FIG. 5.

The concrete implementation process is as follows: acquiring a new multi-mode dynamic gated cyclic neural unit by replacing the linear operation in the gated recurrent neural network with the multi-mode dynamic graph convolution. Dynamic graph convolutional gated recurrent unit (MDGRU) is defined as:

$$r^{(t)} = \sigma(\theta_r *_G [h^{(t)}, H^{(t-1)}] + b_r)$$

$$u^{(t)}=\sigma(\theta_u *_G[h^{(t)},H^{(t-1)}]+b_u)$$

$$c^{(t)}=\tanh(\theta_c *_G[h^{(t)},(r^{(t)}\square H^{(t-1)})]+b_c)$$

$$H^{(t)}=u^{(t)}\square H^{(t-1)}+(1-u^{(t)})\square c^{(t)}$$

where $h^{(t)}$ and $H^{(t)}$ represent the output of the dynamic fusion module and the output of GRU at time step t, respectively, $\square$ represents Hadamard product, and a is the activation function. Resetting the door r(t) helps to forget unnecessary information. The update gate u(t) can control the output. $\theta_r$, $\theta_u$, and $\theta_c$ is the corresponding filter parameters.

Figure 6:
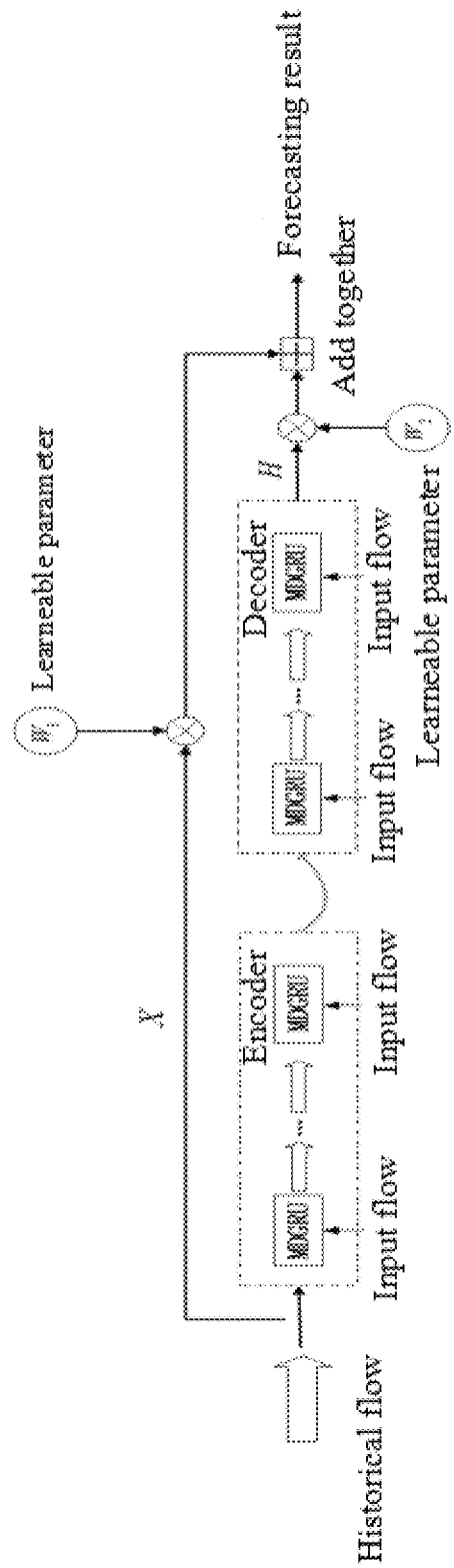
FIG. 6 is an example diagram of a dynamic residual fusion module according to an embodiment of the present application.

S04: fusing the historical characteristics of traffic flow and characteristics of decoding end. As a kind of time series data, future traffic flow data may be influenced by historical traffic flow data. The application designs a dynamic residual fusion module, which dynamically combines input data with extracted data, and the process is shown in FIG. 6.

The specific implementation process is as follows: defining two trainable parameters $W_1$ and $W_2$, multiplying the original input data X and output data H in the decoder by the two parameters respectively, and fusing the two parts of data through parameter training dynamically. The process of dynamic residual fusion mechanism can be expressed as:

$$Y=H\times W_1+X\times W_2$$

where H represents the final output of the decoder and X represents the original input data. W1 and $W_2$ will be updated with the training of the model.

To sum up, the traffic flow forecasting method of the multi-mode dynamic residual graph convolution network of the present application learns the traffic characteristics corresponding to different traffic modes from historical traffic data, and uses the dynamic fusion module to fuse the traffic characteristics of different modes. The linear operation in the recurrent neural network is replaced by the multi-mode graph convolution module, which realizes the combination of space dependence and time dependence of traffic flow. Finally, the dynamic residual module is used to select useful information from the historical flow to update the future flow. According to the traffic flow forecasting method of multi-mode dynamic residual graph convolution, traffic characteristics of different traffic modes can be excavated from traffic flow data, and the graph convolution module is combined with the gated circulation unit to realize the combination of traffic space dependence and time dependence.

The above are only the preferred embodiments of this application, but the scope of protection of this application is not limited to this. Any changes or substitutions that can be easily thought of by those skilled in the technical field within the technical scope disclosed in this application should be covered by the scope of protection of this application. Therefore, the scope of protection of this application should be based on the scope of protection of the claims.

What is claimed is:

1. A traffic flow forecasting method based on a multi-mode dynamic residual graph convolution network, comprising:
   extracting multi-traffic-mode of traffic feature by capturing the traffic characteristics corresponding to different traffic modes from the traffic flow data of a road network by using various adjacency matrix construction methods;
   constructing an adjacency matrix using the captured traffic data, and acquiring different traffic flow modes based on the adjacency matrix;
   fusing the different traffic flow modes dynamically through learned parameters within the network; and
   forecasting future traffic based on historical traffic flow data and fused data.

2. The method according to claim 1, wherein the adjacency matrix comprises a relational matrix and an adaptive matrix, and the relational matrix is constructed as follows:

$$[X_{t_a:t_a+\tau-1}]\xrightarrow{similarity}\overline{A}_{rel},$$

$$A_{rel}=\text{softmax}(\overline{A}_{rel}),$$

wherein subscript $t_a$ represents a first time step of generating the relational matrix traffic data, $\tau$ represents that the relational matrix is constructed with traffic data of $\tau$ historical time steps, and soft max represents an activation function;

wherein the adaptive matrix is constructed as follows:

$$A_{ada}=\text{soft max}(\text{Relu}(E_1 E_2^T)),$$

wherein both $E_1$ and $E_2$ represent learning nodes, ReLU represents an activation function, and T represents a matrix transposition.

3. The method according to claim 2, wherein the different traffic flow modes comprise time traffic dependence and space traffic dependence, the process of acquiring different traffic flow modes based on the adjacency matrix comprises:
   acquiring the time traffic dependence based on the relational matrix, and acquiring the space traffic dependence based on the adaptive matrix.

4. The method according to claim 3, wherein the process of fusing the different traffic flow modes dynamically comprises: fusing the time traffic dependence and the space traffic dependence of the traffic flow in time and space.

5. The method according to claim 4, wherein in the process of fusing the time traffic dependence and the space traffic dependence of the traffic flow in time and space, a following formula is adopted for fusion:

$$h=W_{rel}\times h_{rel}+W_{ada}\times h_{ada}$$

wherein h represents a final output, $h_{rel}$ represents characteristics of time traffic dependence, $h_{ada}$ represents characteristics of space traffic dependence, and $W_{rel}$ and $W_{ada}$ represent two learning parameters, which are updated during neural network training to dynamically fuse characteristics of time dependence and space dependence.

6. The method according to claim 1, wherein the process of forecasting future traffic based on the historical data and the fused data comprises:
   constructing a decoder, inputting the historical traffic flow data into the decoder to obtain output data; and
   fusing the historical data and output results based on a dynamic residual fusion mechanism to obtain a forecasting result of future traffic.

7. The method according to claim 6, wherein the process of fusing the historical data and the output results based on the dynamic residual fusion mechanism comprises:
   fusing by using the following formula:

$$\hat{Y}=H\times W_1+X\times W_2$$

wherein H represents the final output of the decoder, X represents the historical traffic flow data of an original input, and $W_1$ and $W_2$ represent training parameters.

8. The method according to claim 7, wherein a root mean square error loss function is a root mean square error, and the formula of the loss function is as below:

$$RMSE = \sqrt{\frac{1}{Q}\sum_i (Y_i - \hat{Y}_i)^2},$$

wherein $\hat{Y}_i$ and $Y_i$ represent a true value and a forecasting value respectively, and Q represents forecasted time steps.

* * * * *